United States Patent [19]

Fujii

[11] Patent Number: 4,592,626
[45] Date of Patent: Jun. 3, 1986

[54] COMPACT ZOOM LENS SYSTEM

[75] Inventor: Tooru Fujii, Hino, Japan

[73] Assignee: Olympus Optical Co., Ltd., Tokyo, Japan

[21] Appl. No.: 670,123

[22] Filed: Nov. 9, 1984

Related U.S. Application Data

[63] Continuation of Ser. No. 446,418, Dec. 2, 1982, abandoned.

[30] Foreign Application Priority Data

Dec. 8, 1981 [JP] Japan ................................. 56-196283

[51] Int. Cl.$^4$ .............................................. G02B 15/14
[52] U.S. Cl. .................................................. 350/427
[58] Field of Search ................ 350/423, 427, 430, 428

[56] References Cited

U.S. PATENT DOCUMENTS

| | | | |
|---|---|---|---|
| 3,884,555 | 5/1975 | Suwa et al. | 350/428 |
| 4,299,454 | 11/1981 | Betensky | 350/450 |
| 4,306,776 | 12/1981 | Someya | 350/427 |
| 4,380,376 | 4/1983 | Suda et al. | 350/427 |

Primary Examiner—John K. Corbin
Assistant Examiner—P. M. Dzierzynski
Attorney, Agent, or Firm—Cushman, Darby & Cushman

[57] ABSTRACT

A compact zoom lens system is disclosed having a first lens group with positive refractive power, a second lens group with negative refractive power, a third lens group with positive refractive power, and a fourth lens group with negative refractive power, such that the second and third lens groups are moved for the purpose of zooming, and the first lens group is moved in order to compensate for the movement of image surface, the entire system having a large zoom ratio.

21 Claims, 4 Drawing Figures

COMPACT ZOOM LENS SYSTEM

This is a continuation of application Ser. No. 446,418, filed Dec. 2, 1982 and now abandoned.

BACKGROUND OF THE INVENTION (a) Field of the Invention

The present invention relates to a compact zoom lens system comprising four lens groups.

(b) Description of the Prior Art

Known zoom lens systems comprising four lens groups are generally composed of a focusing lens group having positive refractive power, a variator having negative refractive power, a compensator having positive refractive power and a relay lens group having positive refractive power. As widely known, such a zoom lens system is arranged to be zoomed by moving the variator along the optical axis and to compensate for the movement of image surface, which is caused at that time, by moving the compensator along the optical axis. The lens system is focused by moving the focusing lens group.

Such known zoom lens systems comprising four lens groups have a disadvantage that the lens system becomes large in size due to the amount of movement of movable lens groups, i.e., the variator and compensator, is comparatively large. Especially when it is arranged to make the zoom ratio large, the above-mentioned amounts of movement become large. To make the zoom ratio large by making the abovementioned amounts of movement comparatively small, the power of the variator should be made large. When, however, power of the variator is made large, aberrations are aggravated; variation of aberrations caused when the variator is moved also become large, and it becomes considerably difficult to correct them. Moreover, to correct the above-mentioned aggravated aberrations and variation of aberrations, it is necessary to increase the number of lenses constituting the lens system, and, as a result, it becomes impossible to make the lens system compact.

SUMMARY OF THE INVENTION

It is, therefore, a primary object of the present invention to provide a compact zoom lens system comprising four lens groups, i.e., a first lens group, a second lens group, a third lens group and a fourth lens group, for which a new lens-group moving method is adopted, i.e., the second lens group and the third lens group are individually moved for the purpose of zooming and, at the same time, the first lens group is moved for the purpose of compensating for the movement of image surface, said compact zoom lens system comprising four lens groups being arranged that the vari-focal ratio is large, aberrations can be corrected easily and the telephoto ratio is small.

Figure 1:
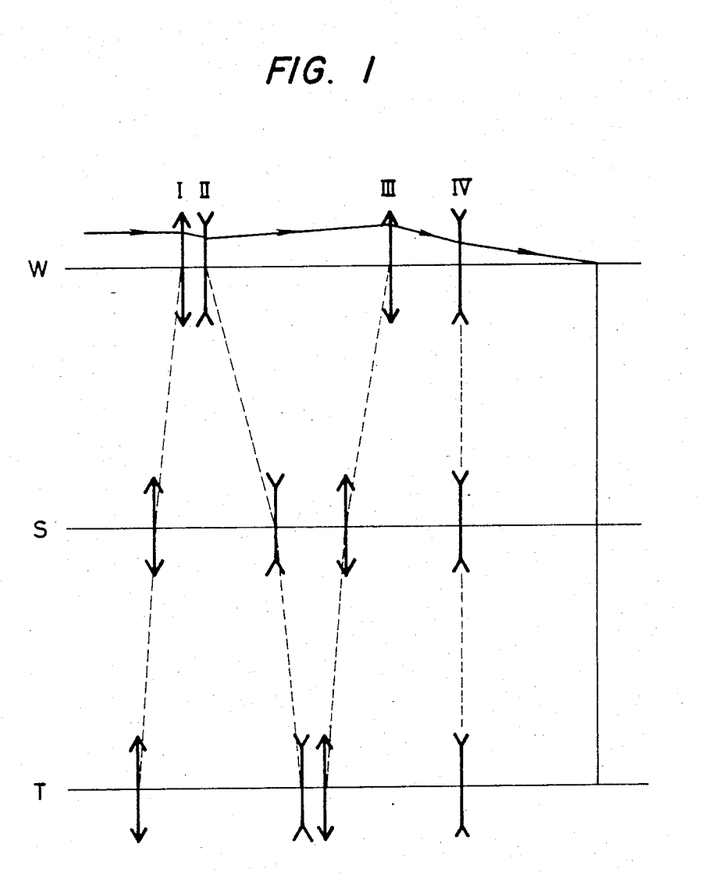
FIG. 1 shows a schematic diagram illustrating the basic composition and lens-group moving method of the zoom lens system according to the present invention.
Figure 2:
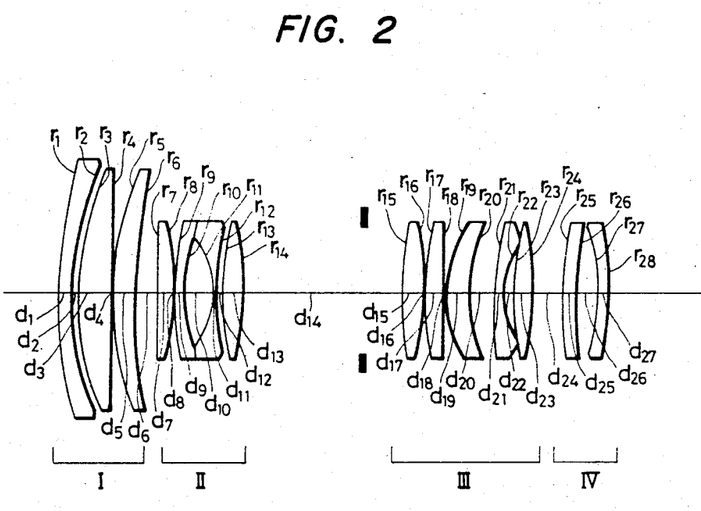
FIG. 2 shows a sectional view of the zoom lens system according to the present invention.
Figure 3:
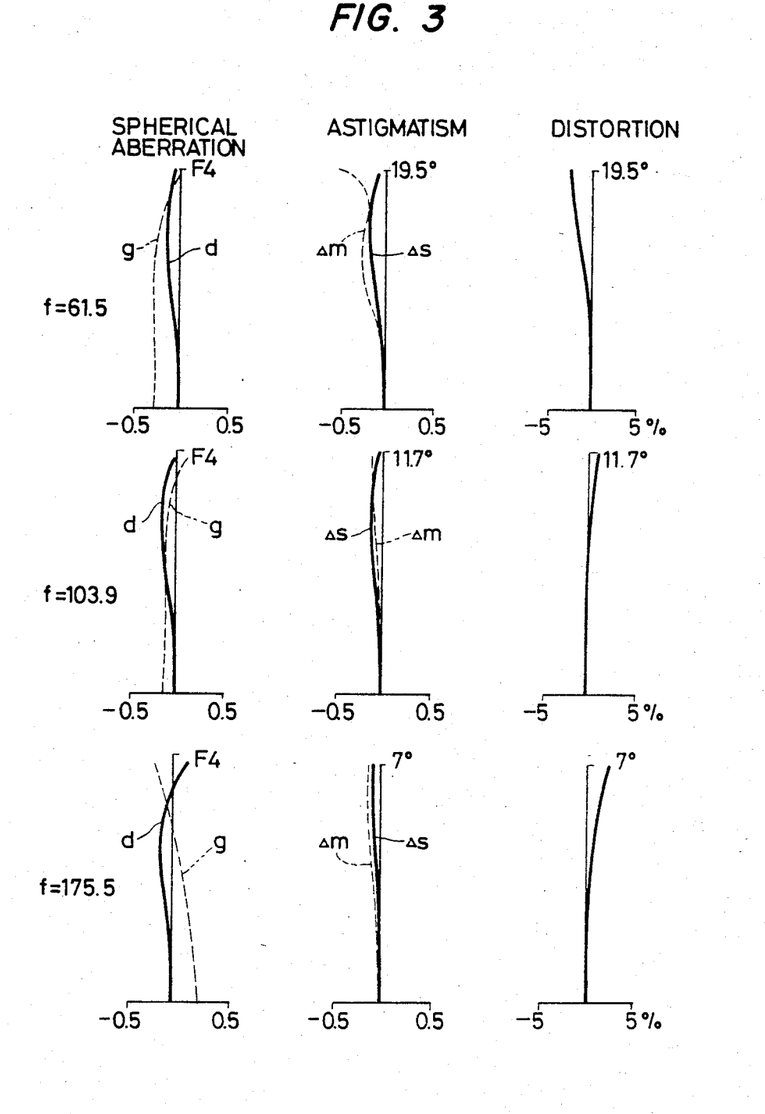
FIG. 3 shows graphs illustrating aberration curves of Embodiment 1 of the present invention.
Figure 4:
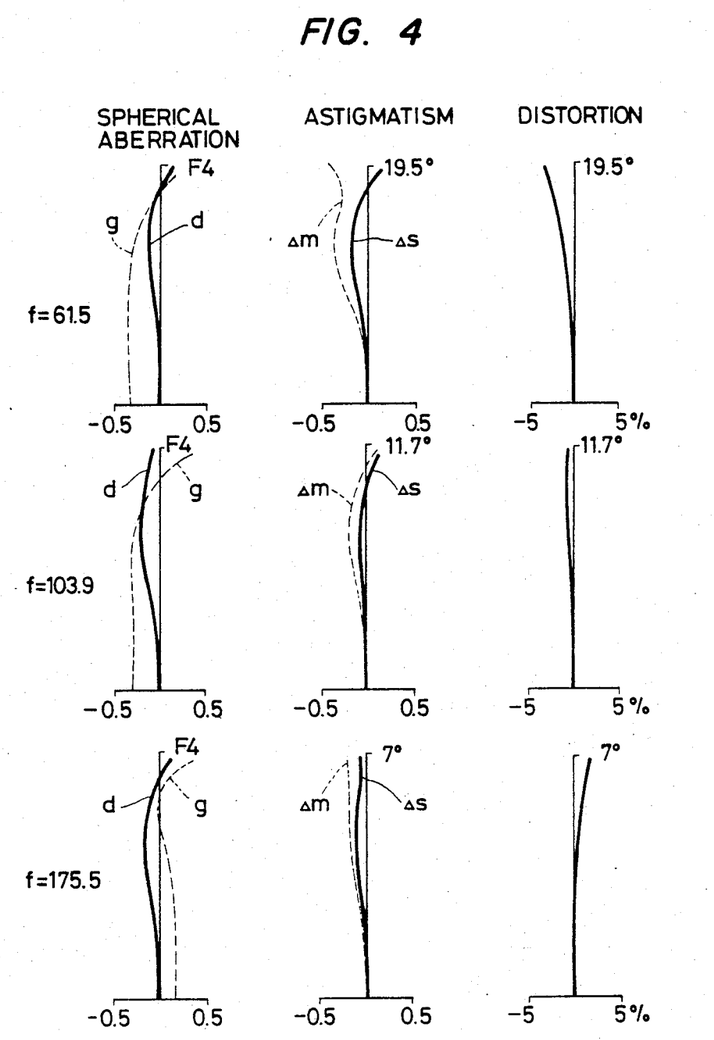
FIG. 4 shows graphs illustrating aberration curves of Embodiment 2 of the present invention.

FIG. 1 shows a schematic diagram illustrating respective lens group constituting the compact zoom lens system according to the present invention and the new lens-group moving method adopted for said zoom lens system.

The compact zoom lens system according to the present invention comprises a first lens group I having positive refractive power, a second lens group II having negative refractive power, a third lens group III having positive refractive power, and a fourth lens group IV having negative refractive power, in order from the object side. Out of these lens groups, the second lens group II and the third lens group III are moved as shown in FIG. 1 for the purpose of zooming. In other words, the second lens group and the third lens group are respectively arranged as variators. When the second lens group II and the third lens group III are moved as shown in FIG. 1, the first lens group I is moved as shown in FIG. 1 in order to compensate for the movement of the image surface. That is, the first lens group I is arranged to serve as a focusing lens group and, at the same time, as a compensator. The fourth lens group IV is a relay lens group which is kept fixed during zooming and relays the image formed by the third lens group III to the final image surface at a certain magnification.

For the zoom lens system composed as shown in FIG. 1 and arranged to move the lens group as shown in FIG. 1, there are relations expressed by the formulas (1) and (2), shown below, when the focal lengths of the first lens group I, the second lens group II and the third lens group III are respectively represented by reference symbols $f_1$, $f_2$ and $f_3$, magnification of the second lens group II in the wide position W shown in FIG. 1 is represented by reference symbol $\beta_{2W}$, magnification of the second lens group II in the teleposition T shown in FIG. 1 is represented by reference symbol $\beta_{2T}$, magnification of the third lens group III in said wide position W is represented by reference symbol $\beta_{3W}$, magnification of the third lens group III in said teleposition T is represented by reference symbol $\beta_{3T}$, and magnification of the fourth lens group IV is represented by reference symbol $\beta_4$, and when respective lens groups are regarded as thin lenses and airspaces between respective lens groups when said lens groups approach each other most closely are regarded as zero.

$$f_1 = f_2(1 - 1/\beta_{2W}) \qquad (1)$$

$$(\beta_{2T} - 1)f_2 = f_3 - f_3/\beta_{3T} \qquad (2)$$

When the focal length of the lens system as a whole in the wide position is represented by reference symbol $f_W$ and the focal length of the lens system as a whole in the teleposition is represented by reference symbol $f_T$, it is possible to express $f_W$ and $f_T$ by the formulas (3) and (4) shown below.

$$f_W = f_1 \cdot \beta_{2W} \cdot \beta_{3W} \cdot \beta_4 \qquad (3)$$

$$f_T = f_1 \cdot \beta_{2T} \cdot \beta_{3T} \cdot \beta_4 \qquad (4)$$

Therefore, the zoom ratio V of the zoom lens system becomes as shown in formula (5), shown below.

$$V = f_T/f_W = \frac{\beta_{2T}}{\beta_{2W}} \cdot \frac{\beta_{3T}}{\beta_{3W}} = V_2 \cdot V_3 \qquad (5)$$

In the formula (5), reference symbol $V_2$ represents the magnification ratio $(\beta_{2T})/\beta_{2W}$ of the second lens group between the telephoto and wide positions, and reference symbol $V_3$ represents the magnification ratio $(\beta_{3T})/\beta_{3W}$ of the third lens group between the telephone and wide positions.

Even when the zoom ratio V is defined by formula (5), it is possible to select $V_2$ and $V_3$ arbitrarily to some degree. Therefore, when deciding the basic composition of a zoom lens system with a certain zoom range based on the formulas (1), (2) and (5), it is possible to compose a zoom lens system attaining the object of the present invention as far as the values of $\beta_{2W}$, $\beta_{3T}$, $V_2/V_3$ and $\beta_4$ are selected.

For example, to make the overall length of the lens system short without causing aggravation of aberrations and to prevent the amounts of movement of movable lens groups from becoming large, magnifications of movable lens groups generally varies so that the ranges of variation of magnification contain ×1. When this point is taken into consideration, it is preferable to make $\beta_{2W}$ about $-0.5$.

Besides, when the magnification of the third lens group is made high, the back focal length $f_B$ becomes long. When, however, the magnification of the third lens group is made too low, the focal length of the third lens group becomes short, and this is not preferable for correction of aberrations. From the viewpoint described above, it is preferable to make $\beta_{3T}$ about $-1.5$.

Furthermore, the zoom lens system according to the present invention is characterized in that the magnification thereof is varied by two lens groups, i.e., the second lens group and the third lens group. To effectively utilize this characteristic, it is preferable to establish the magnification ratio $V_2$ of the second lens group approximately equal to the magnification ratio $V_3$ of the third lens group. For the above-mentioned reason, it is preferable to arrange that $V_2/V_3$ becomes about 1.0.

When the values of the above-mentioned parameters are decided, the value of $\beta_4$ is approximately decided. When the above-mentioned parameters are set as above, the value of $\beta_4$ becomes 1.43.

As described above, an example of a zoom lens system which attains the object of the present invention may be considered as follows.

$\beta_{2W}=0.5$, $\beta_{3T}=1.5$, $V_2/V_3=1.0$, $\beta_4=1.43$

For focal lengths of respective lens groups, i.e., for $f_1$, $f_2$, $f_3$ and $f_4$, values shown below may be considered as values which are practically possible and which are reasonable in general.

$f_1=3$, $f_2=-1$, $f_3=1$, $f_4=-3.5$

When a zoom lens system with $V=3$ is established, it becomes $V_2=V_3=1.73$.

As the overall length L of the lens system becomes as shown by the formula $$L \approx f_1 + 2f_2 + f_3 + (\beta_2 f_2 - \beta_4 f_4) - \left(\frac{f_2}{\beta_2} + \frac{f_3}{\beta_3} - \frac{f_4}{\beta_4}\right),$$

values of $\beta_{2T}$, $\beta_{3W}$, etc. become as follows from the above-mentioned formula, formulas (1) through (5), shown before, and the above-mentioned given values of parameters:

$\beta_{2T}=0.866$, $\beta_{3W}=-0.866$, $L_W=4.2$, $L_T=4.94$, $f_W=1.857$, $f_T=5.573$.

where, reference symbols $L_W$ and $L_T$ respectively represent overall lengths of the lens system in the wide position and teleposition.

As it is evident from the example shown above, it is possible to obtain the basic composition of the desired zoom lens system through practice of the presently disclosed invention.

For the zoom lens system as described above, it is preferable to arrange the aperture stop in front of the third lens group because it is then possible to keep the diameter of the front lens small. In that case, the aperture stop may be fixed with respect to the third lens group so as to move together with the third lens group, or may be fixed in a space in front of the third lens group.

For respective lens groups according to the present invention described above, the following may be considered. It is preferable that the first lens group comprises a negative lens and two positive lenses, or comprises a cemented doublet, which consists of a negative lens and a positive lens; and a positive lens, the second lens group comprises four lenses including at least two negative lenses; and the third lens group comprises five lenses including at least one negative lens which are arranged to form a triplet type lens group. The third lens group is arranged as a variator according to the present invention. To keep a certain airspace with respect to the second lens group and to increase the magnification of the third lens group, it is necessary to shift the principal point of the third lens group as forward as possible.

When the first, second and third lens groups are arranged as described above, the fourth lens group is established with negative refractive power, and comprises at least one positive lens and at least one negative lens so that the lateral chromatic aberration will not be largely caused by the fourth lens group.

For a zoom lens system employing the lens-group moving method according to the present invention, the establishment of the magnification ratio $V_2$ of the second lens group and magnification ratio $V_3$ of the third lens group is an important point for balancing the variation of aberrations caused at the time of zooming. As the third lens group has positive power, the overall length of the lens system becomes long if the magnification ratio $V_3$ of the third lens group is made too large, and this is not desirable. If the magnification ratio $V_2$ of the second lens group is made too large, the variation of coma and distortion caused by the diverging action of the second lens group becomes large.

Due to the above, it is preferable to select the magnification ratio $V_2$ of the second lens group about one half to twice of the magnification ratio $V_3$ of the third lens group. That is, it is preferable to arrange the following relationship: $0.5 < V_2/V_3 < 2.0$. Then, it is necessary that the magnification $\beta_4$ of the fourth lens group fulfills the condition shown below to give the correcting action for curvature of image to the fourth lens group, and to keep the focal length of the lens system, as a whole, long.

$1.5 > \beta_4 > 1$

If the magnification $\beta_4$ becomes smaller than 1, The correcting action for curvature of image becomes weak. If $\beta_4$ becomes larger than 1.5, aberrations caused by the first through the third lens groups becomes large. Moreover, the back focal length of the lens system becomes too long, and this is not preferable for making the overall length of the lens system short.

When it is desired to focus the zoom lens system according to the present invention described in the above on an object at an extremely short distance (at the time of macro-photographing), focusing becomes possible when the third lens group is moved toward the object side. That is, when the third lens group is moved toward the object side being shifted from the position of ×1, especially in the wide position, the rear focal point of the lens system as a whole is shifted toward the object side. Therefore, it becomes possible to focus the lens system on an object at an extremely short distance.

In the same manner, when the fourth lens group is moved toward the image side, the magnification of the fourth lens group decreases and, therefore, it becomes possible to focus the lens system on an object at an extremely short distance.

It is also possible to simultaneously perform the above-mentioned focusing by movement of the third lens group and focusing by movement of the fourth lens group. That is, it is possible to focus the lens system on an object at an extremely short distance by moving the third lens group toward the object side and moving the fourth lens group toward the image side at the same time.

DETAILED DESCRIPTION OF THE PREFERRED EMBODIMENTS

Presently preferred embodiments of the compact zoom lens system according to the present invention are shown below.

Embodiment 1
$f = 61.5 \sim 175.5$, F 4

$r_1 = 106.48$
$d_1 = 2.5$   $n_1 = 1.80518$   $\nu_1 = 25.4$
$r_2 = 65.71$
$d_2 = 1.2$
$r_3 = 59.88$
$d_3 = 7.5$   $n_2 = 1.47069$   $\nu_2 = 67.4$
$r_4 = -483.33$
$d_4 = 0.15$
$r_5 = 61.68$
$d_5 = 5.2$   $n_3 = 1.51633$   $\nu_3 = 64.2$
$r_6 = 118.86$
$d_6$ (variable)
$r_7 = -1825.47$
$d_7 = 3.8$   $n_4 = 1.617$   $\nu_4 = 62.8$
$r_8 = -70.26$
$d_8 = 0.12$
$r_9 = 255.67$
$d_9 = 1.48$   $n_5 = 1.7725$   $\nu_5 = 49.7$
$r_{10} = 35.46$
$d_{10} = 5.2$
$r_{11} = -26.29$
$d_{11} = 1.48$   $n_6 = 1.7859$   $\nu_6 = 44.2$
$r_{12} = 49.78$
$d_{12} = 1.4$
$r_{13} = 61.75$
$d_{13} = 4.6$   $n_7 = 1.80518$   $\nu_7 = 25.4$
$r_{14} = -72.01$
$d_{14}$ (variable)
$r_{15} = 146.01$
$d_{15} = 3.5$   $n_8 = 1.48749$   $\nu_8 = 70.2$
$r_{16} = -93.72$
$d_{16} = 0.12$
$r_{17} = 53.04$
$d_{17} = 4.4$   $n_9 = 1.48749$   $\nu_9 = 70.2$
$r_{18} = -2191.73$
$d_{18} = 0.12$
$r_{19} = 23.72$
$d_{19} = 5.45$   $n_{10} = 1.48749$   $\nu_{10} = 70.2$
$r_{20} = 52.78$
$d_{20} = 5.2$
$r_{21} = 127.72$
$d_{21} = 1.8$   $n_{11} = 1.80518$   $\nu_{11} = 25.4$
$r_{22} = 23.39$
$d_{22} = 2.2$
$r_{23} = 51.19$ -continued $d_{23} = 4.5$   $n_{12} = 1.64769$   $\nu_{12} = 33.8$
$r_{24} = -79.16$
$d_{24}$ (variable)
$r_{25} = 210.61$
$d_{25} = 4$   $n_{13} = 1.65128$   $\nu_{13} = 38.3$
$r_{26} = 257.53$
$d_{26} = 4.5$
$r_{27} = -35.09$
$d_{27} = 2$   $n_{14} = 1.7859$   $\nu_{14} = 44.2$
$r_{28} = -56.42$

| f | $d_6$ | $d_{14}$ | $d_{24}$ |
|---|---|---|---|
| 61.5 | 4.091 | 34.895 | 5.43 |
| 103.9 | 28.48 | 20.671 | 8.158 |
| 175.5 | 38.591 | 0.654 | 18.064 |

$L_W = 171.2$,   $L_T = 184.1$,   $f_B = 54.4$
$f_1 = 120$,   $f_2 = -34.5$,   $f_3 = 41$,
$f_4 = -125$,   $V_2/V_3 = 0.7623$,   $\beta_4 = 1.27$ Embodient 2
$f = 61.5 \sim 175.5$, F 4

$r_1 = 109.68$
$d_1 = 2.5$   $n_1 = 1.78472$   $\nu_1 = 25.7$
$r_2 = 56.36$
$d_2 = 2$
$r_3 = 59.15$
$d_3 = 6$   $n_2 = 1.56873$   $\nu_2 = 63.2$
$r_4 = 195.29$
$d_4 = 0.15$
$r_5 = 55.98$
$d_5 = 4.7$   $n_3 = 1.56965$   $\nu_3 = 49.3$
$r_6 = 253.84$
$d_6$ (variable)
$r_7 = -377.57$
$d_7 = 3.8$   $n_4 = 1.6228$   $\nu_4 = 57.1$
$r_8 = -68.13$
$d_8 = 0.12$
$r_9 = 54.53$
$d_9 = 1.48$   $n_5 = 1.7859$   $\nu_5 = 44.2$
$r_{10} = 27.34$
$d_{10} = 5.6$
$r_{11} = -25.31$
$d_{11} = 1.48$   $n_6 = 1.7725$   $\nu_6 = 49.7$
$r_{12} = 55.99$
$d_{12} = 1.2$
$r_{13} = 64.98$
$d_{13} = 4.1$   $n_7 = 1.84666$   $\nu_7 = 23.9$
$r_{14} = -119.67$
$d_{14}$ (variable)
$r_{15} = -396.99$
$d_{15} = 3.8$   $n_8 = 1.48749$   $\nu_8 = 70.2$
$r_{16} = -44.98$
$d_{16} = 0.12$
$r_{17} = 85.66$
$d_{17} = 3$   $n_9 = 1.48749$   $\nu_9 = 70.2$
$r_{18} = -207.78$
$d_{18} = 0.12$
$r_{19} = 21.78$
$d_{19} = 6.45$   $n_{10} = 1.48749$   $\nu_{10} = 70.2$
$r_{20} = 48.17$
$d_{20} = 5.2$
$r_{21} = -3970.3$
$d_{21} = 1.8$   $n_{11} = 1.78472$   $\nu_{11} = 25.7$
$r_{22} = 24.03$
$d_{22} = 2.2$
$r_{23} = 41.78$
$d_{23} = 4.5$   $n_{12} = 1.64769$   $\nu_{12} = 33.8$
$r_{24} = -72.94$
$d_{24}$ (variable)
$r_{25} = 1192.6$
$d_{25} = 4$   $n_{13} = 1.5927$   $\nu_{13} = 35.3$
$r_{26} = -168.94$
$d_{26} = 3$
$r_{27} = -42.25$
$d_{27} = 2$   $n_{14} = 1.7725$   $\nu_{14} = 49.7$
$r_{28} = -127.95$

| f | $d_6$ | $d_{14}$ | $d_{24}$ |
|---|---|---|---|
| 61.5 | 6.141 | 35.273 | 5.746 |
| 103.888 | 27.191 | 19.392 | 11.362 |
| 175.5 | 42.078 | 2.137 | 18.072 |

-continued

| $L_W = 170$, | $L_T = 185.3$, | $f_B = 53.7$ |
| --- | --- | --- |
| $f_1 = 124$, | $f_2 = -34.5$, | $f_3 = 40$ |
| $f_4 = 125$, | $V_2/V_3 = 0.867$, | $\beta_4 = 1.32$ |

In embodiments shown above, reference symbols $r_1$ through $r_{28}$ respectively represent radii of curvature of respective lens surfaces, reference synmbols $d_1$ through $d_{27}$ respectively represent thicknesses of respective lenses and airspaces between respective lenses, reference symbols $n_1$ through $n_{14}$ respectively represent refractive indices of respective lenses, reference symbols $\nu_1$ through $\nu_{14}$ respectively represent Abbe's numbers of respective lenses, reference symbols $L_W$ and $L_T$ respectively represent the overall lengths of the lens system in the wide position and teleposition, and reference symbol $f_B$ represents the back focal length of the lens system.

Of the embodiments shown above, Embodiment 1 is arranged that the aperture stop is arranged such at the position of 0.2 in front of the third lens group and is moved together with the third lens group. Embodiment 2 is arranged such that the aperture stop is fixed at the position of 110.5 from the image surface.

As it is evident from the foregoing description and detailed embodiments, the compact zoom lens system comprising four lens groups in accordance with the present invention is composed of a smaller number of lenses compared with known zoom lens system, and, at the same time, ensures excellent performance.

I claim:

1. A compact zoom lens system, comprising:
   four lens groups, first, second, third and fourth, wherein said first lens group has positive refractive power and is arranged as a compensator, said second lens group has negative refractive power and is arranged as a variator, said third lens group has positive refractive power and is arranged as a variator, said fourth lens group has negative refractive power and is arranged in the rearmost position; said first, second and third lens groups constituting a zooming sub-system having positive refractive power as a whole;
   said compact zoom lens system permitting movement of said second lens group and said third lens group along the optical axis for the purpose of zooming; said zoom lens system moving said first lens group in order to compensate for the movement of image surface caused when said second lens group and said third lens group are moved, wherein said first lens group and said third lens group are moved toward the object side, said second lens group are moved toward the image side and said fourth lens group are kept fixed when the focal length thereof is varied from the teleposition to the wide position, said zoom lens system being further arranged to fulfill the following conditions where reference symbol $V_2$ represents the magnification ratio of said second lens group between the telephoto and wide positions, and reference symbol $V_3$ represents the magnification ratio of said third lens group between the telephoto and wide positions
   $0.5 < V_2/V_3 < 2.0$.

2. A compact zoom lens system according to claim 1 further comprising an aperture stop fixed at a pre-determined position independently of the movements of said first lens group, said second lens group and said third lens group given at the time of zooming.

3. A compact zoom lens system according to claim 1 further comprising an aperture stop arranged to be moved together with said third lens group at the time of zooming.

4. A compact zoom lens system according to claim 1 wherein said first lens group comprises at least three lens elements including a negative lens, said second lens group comprises four lens elements including two negative lenses, said third lens group comprises five lens elements including at least one negative lens, and said fourth lens group comprises a positive lens and a negative lens.

5. A compact zoom lens system according to claim 4 wherein said first lens group comprises a cemented doublet, which consists of a negative lens and a positive lens, and a positive lens.

6. A compact zoom lens system according to claim 5 arranged to be focused on an object at an extremely short distance by moving said third lens group toward the object side.

7. A compact zoom lens system according to claim 1 arranged to be focused on an object at an extremely short distance by moving said fourth lens group toward the image side.

8. A compact zoom lens system according to claim 1 arranged to be focused on an object at an extremely short distance by simultaneously moving said third lens group toward the object side and said fourth lens group toward the image side.

9. A compact zoom lens system according to claim 5 arranged to be focused on an object at an extremely short distance by simultaneously moving said third lens group toward the object side and said fourth lens group toward the image side.

10. A compact zoom lens system according to claim 2 further arranged to fulfill the following condition where reference symbol $B_4$ represents the magnification of said fourth lens group
   $1 < B_4 < 1.5$.

11. A compact zoom lens system according to claim 3 further arranged to fulfill the following condition where reference symbol $B_4$ represents the magnification of said fourth lens group
   $1 < B_4 < 1.5$.

12. A compact zoom lens system according to claim 4 further arranged to fulfill the following condition where reference symbol $B_4$ represents the magnification of said fourth lens group
   $1 < B_4 < 1.5$.

13. A compact zoom lens system according to claim 5 further arranged to fulfill the following condition where reference symbol $B_4$ represents the magnification of said fourth lens group
   $1 < B_4 < 1.5$.

14. A compact zoom lens system according to claim 6 further arranged to fulfill the following condition where reference symbol $B_4$ represents the magnification of said fourth lens group
   $1 < B_4 < 1.5$.

15. A compact zoom lens system according to claim 7 further arranged to fulfill the following condition $B_4$ represents the magnification of said fourth lens group
   $1 < B_4 < 1.5$.

16. A compact zoom lens system according to claim 8 further arranged to fulfill the following condition where reference symbol $B_4$ represents the magnification of said fourth lens group $1 < B_4 < 1.5$.

17. A compact zoom lens system according to claim 3 wherein said first lens group comprises a negative lens, positive lens and a positive lens, said second lens group comprises a positive lens, a negative lens, a negative lens and a positive lens, said third lens group comprises a positive lens, a positive lens, a positive lens, a negative lens and a positive lens, and said fourth lens group comprises a positive lens and a negative lens, said compact zoom lens system being further arranged to have the following numerical data:

| $f = 61.5 \sim 175.5$, F 4 | | | |
|---|---|---|---|
| $r_1 = 106.48$ | | | |
| $d_1 = 2.5$ | | $n_1 = 1.80518$ | $\nu_1 = 25.4$ |
| $r_2 = 65.71$ | | | |
| $d_2 = 1.2$ | | | |
| $r_3 = 59.88$ | | | |
| $d_3 = 7.5$ | | $n_2 = 1.47069$ | $\nu_2 = 67.4$ |
| $r_4 = -483.33$ | | | |
| $d_4 = 0.15$ | | | |
| $r_5 = 61.68$ | | | |
| $d_5 = 5.2$ | | $n_3 = 1.51633$ | $\nu_3 = 64.2$ |
| $r_6 = 118.86$ | | | |
| $d_6$ (variable) | | | |
| $r_7 = -1825.47$ | | | |
| $d_7 = 3.8$ | | $n_4 = 1.617$ | $\nu_4 = 62.8$ |
| $r_8 = -70.26$ | | | |
| $d_8 = 0.12$ | | | |
| $r_9 = 255.67$ | | | |
| $d_9 = 1.48$ | | $n_5 = 1.7725$ | $\nu_1 = 49.7$ |
| $r_{10} = 35.46$ | | | |
| $d_{10} = 5.2$ | | | |
| $r_{11} = -26.29$ | | | |
| $d_{11} = 1.48$ | | $n_6 = 1.7859$ | $\nu_6 = 44.2$ |
| $r_{12} = 49.78$ | | | |
| $d_{12} = 1.4$ | | | |
| $r_{13} = 61.75$ | | | |
| $d_{13} = 4.6$ | | $n_7 = 1.80518$ | $\nu_7 = 25.4$ |
| $r_{14} = -72.01$ | | | |
| $d_{14}$ (variable) | | | |
| $r_{15} = 146.01$ | | | |
| $d_{15} = 3.5$ | | $n_8 = 1.48749$ | $\nu_8 = 70.2$ |
| $r_{16} = -93.72$ | | | |
| $d_{16} = 0.12$ | | | |
| $r_{17} = 53.04$ | | | |
| $d_{17} = 4.4$ | | $n_9 = 1.48749$ | $\nu_9 = 70.2$ |
| $r_{18} = -2191.73$ | | | |
| $d_{18} = 0.12$ | | | |
| $r_{19} = 23.72$ | | | |
| $d_{19} = 5.45$ | | $n_{10} = 1.48749$ | $\nu_{10} = 70.2$ |
| $r_{20} = 52.78$ | | | |
| $d_{20} = 5.2$ | | | |
| $r_{21} = 127.72$ | | | |
| $d_{21} = 1.8$ | | $n_{11} = 1.80518$ | $\nu_{11} = 25.4$ |
| $r_{22} = 23.39$ | | | |
| $d_{22} = 2.2$ | | | |
| $r_{23} = 51.19$ | | | |
| $d_{23} = 4.5$ | | $n_{12} = 1.64769$ | $\nu_{12} = 33.8$ |
| $r_{24} = -79.16$ | | | |
| $d_{24}$ (variable) | | | |
| $r_{25} = 210.61$ | | | |
| $d_{25} = 4$ | | $n_{13} = 1.65128$ | $\nu_{13} = 38.3$ |
| $r_{26} = 257.53$ | | | |
| $d_{26} = 4.5$ | | | |
| $r_{27} = -35.09$ | | | |
| $d_{27} = 2$ | | $n_{14} = 1.7859$ | $\nu_{14} = 44.2$ |
| $r_{28} = -56.42$ | | | |

| f | $d_6$ | $d_{14}$ | $d_{24}$ |
|---|---|---|---|
| 61.5 | 4.091 | 34.895 | 5.43 |
| 103.9 | 28.48 | 20.671 | 8.158 |
| 175.5 | 38.591 | 0.654 | 18.064 |

| $L_W = 171.2$, | $L_T = 184.1$, | $f_B = 54.4$ |
|---|---|---|
| $f_1 = 120$, | $f_2 = -34.5$, | $f_3 = 41$, |

-continued

| $f_4 = -125$, | $V_2/V_3 = 0.7623$, | $\beta_4 = 1.27$ |
|---|---|---| wherein reference symbols $r_1$ through $r_{28}$ respectively represent radii of curvature of respective lens surfaces, reference symbols $d_1$ through $d_{27}$ respectively represent thicknesses of respective lenses and airspaces between respective lenses, reference symbols $n_1$ through $n_{14}$ respectively represent refractive indices of respective lenses, reference symbols $\nu_1$ through $\nu_{14}$ respectively represent Abbe's numbers of respective lenses, reference symbol $L_W$ represents the overall length of the lens system in the wide position, reference symbol $L_T$ represents the overall length of the lens system in the telepo-sition, and reference symbol $f_B$ represents the back focal length of the lens system.

18. A compact zoom lens system according to claim 3 wherein said first lens group comprises a negative lens, positive lens and a positive lens, said second lens group comprises a positive lens, a negative lens, a negative lens and a positive lens, said third lens group comprises a positive lens, a positive lens, a positive lens, a negative lens and a positive lens, and said fourth lens group comprises a positive lens and a negative lens, said compact zoom lens system being further arranged to have the following numerical data:

| $f = 61.5 \sim 175.5$, F 4 | | | |
|---|---|---|---|
| $r_1 = 109.68$ | | | |
| $d_1 = 2.5$ | | $n_1 = 1.78472$ | $\nu_1 = 25.7$ |
| $r_2 = 56.36$ | | | |
| $d_2 = 2$ | | | |
| $r_3 = 59.15$ | | | |
| $d_3 = 6$ | | $n_2 = 1.56873$ | $\nu_2 = 63.2$ |
| $r_4 = 195.29$ | | | |
| $d_4 = 0.15$ | | | |
| $r_5 = 55.98$ | | | |
| $d_5 = 4.7$ | | $n_3 = 1.56965$ | $\nu_3 = 49.3$ |
| $r_6 = 253.84$ | | | |
| $d_6$ (variable) | | | |
| $r_7 = -377.57$ | | | |
| $d_7 = 3.8$ | | $n_4 = 1.6228$ | $\nu_4 = 57.1$ |
| $r_8 = -68.13$ | | | |
| $d_8 = 0.12$ | | | |
| $r_9 = 54.53$ | | | |
| $d_9 = 1.48$ | | $n_5 = 1.7859$ | $\nu_5 = 44.2$ |
| $r_{10} = 27.34$ | | | |
| $d_{10} = 5.6$ | | | |
| $r_{11} = -25.31$ | | | |
| $d_{11} = 1.48$ | | $n_6 = 1.7725$ | $\nu_6 = 49.7$ |
| $r_{12} = 55.99$ | | | |
| $d_{12} = 1.2$ | | | |
| $r_{13} = 64.98$ | | | |
| $d_{13} = 4.1$ | | $n_7 = 1.84666$ | $\nu_7 = 23.9$ |
| $r_{14} = -119.67$ | | | |
| $d_{14}$ (variable) | | | |
| $r_{15} = -396.99$ | | | |
| $d_{15} = 3.8$ | | $n_8 = 1.48749$ | $\nu_8 = 70.2$ |
| $r_{16} = -44.98$ | | | |
| $d_{16} = 0.12$ | | | |
| $r_{17} = 85.66$ | | | |
| $d_{17} = 3$ | | $n_9 = 1.48749$ | $\nu_9 = 70.2$ |
| $r_{18} = -207.78$ | | | |
| $d_{18} = 0.12$ | | | |
| $r_{19} = 21.78$ | | | |
| $d_{19} = 6.45$ | | $n_{10} = 1.48749$ | $\nu_{10} = 70.2$ |
| $r_{20} = 48.17$ | | | |
| $d_{20} = 5.2$ | | | |
| $r_{21} = -3970.3$ | | | |
| $d_{21} = 1.8$ | | $n_{11} = 1.78472$ | $\nu_{11} = 25.7$ |
| $r_{22} = 24.03$ | | | |
| $d_{22} = 2.2$ | | | |
| $r_{23} = 41.78$ | | | |
| $d_{23} = 4.5$ | | $n_{12} = 1.64769$ | $\nu_{12} = 33.8$ |
| $r_{24} = -72.94$ | | | |

-continued

| | | |
|---|---|---|
| $d_{24}$ (variable) | | |
| $r_{25} = 1192.6$ | | |
| $d_{25} = 4$ | $n_{13} = 1.5927$ | $\nu_{13} = 35.3$ |
| $r_{26} = -168.94$ | | |
| $d_{26} = 3$ | | |
| $r_{27} = -42.25$ | | |
| $d_{27} = 2$ | $n_{14} = 1.7725$ | $\nu_{14} = 49.7$ |
| $r_{28} = -127.95$ | | |

| f | $d_6$ | $d_{14}$ | $d_{24}$ |
|---|---|---|---|
| 61.5 | 6.141 | 35.273 | 5.746 |
| 103.888 | 27.191 | 19.392 | 11.362 |
| 175.5 | 42.078 | 2.137 | 18.072 |

| | | |
|---|---|---|
| $L_W = 170$, | $L_T = 185.3$, | $f_B = 53.7$ |
| $f_1 = 124$, | $f_2 = -34.5$, | $f_3 = 40$ |
| $f_4 = -125$, | $V_2/V_3 = 0.867$, | $\beta_4 = 1.32$ | wherein reference symbols $r_1$ through $r_{28}$ respectively represent radii of curvature of respective lens surfaces, reference symbols $d_1$ through $d_{27}$ respectively represent thicknesses of respective lenses and airspaces between respective lenses, reference symbols $n_1$ through $n_{14}$ respectively represent refractive indices of respective lenses, reference symbols $\nu_1$ through $\nu_{14}$ respectively represent Abbe's numbers of respective lenses, reference symbol $L_W$ represents the overall length of the lens system in the wide position, reference symbol $L_T$ represents the overall length of the lens system in the teleposition, and reference symbol $f_B$ represents the back focal length of the lens system.

19. A compact zoom lens system, comprising:
   four lens groups, first, second, third and fourth, wherein said first lens group has positive refractive power and is arranged as a compensator, said second lens group has negative refractive power and is arranged as a variator, said third lens group has positive refractive power and is arranged as a variator, said fourth lens group has negative refractive power and is arranged as the rearmost group of the lens system; said first, second and third lens groups constituting a zooming sub-system having positive refractive power as a whole;
   said fourth lens group being kept fixed when the focal length thereof is varied from the teleposition to the wide position;
   said compact zoom lens system permitting movement of said second lens group and said third lens group along the optical axis for the purpose of zooming; and
   said zoom lens system moving said first lens group in order to compensate for the movement of image surface caused when said second lens group and said third lens group are moved.

20. A compact zoom lens system according to claim 19, wherein:
   said first lens group and said second lens group are moved toward the object side and said second lens group is moved toward the image side when the focal length thereof is varied from the teleposition to the wide position.

21. A compact zoom lens system, comprising:
   four lens groups, first, second, third and fourth, wherein said first lens group has positive refractive power and is arranged as a compensator, said second lens group has negative refractive power and is arranged as a variator, said third lens group has positive refractive power and is arranged as a variator, said fourth lens group has negative refractive power and is arranged in the rearmost position, said first, second and third lens groups constituting a zooming sub-system having positive refractive power as a whole;
   said compact zoom lens system permitting movement of said second lens group and said third lens group along the optical axis for the purpose of zooming;
   said zoom lens system moving said first lens group in order to compensate for the movement of image surface caused when said second lens group and said third lens group are moved, wherein said first lens group and said third lens group are moved toward the object side, said second lens group are moved toward the image side and said fourth lens group are kept fixed when the focal length thereof is varied from the teleposition to the wide position, said zoom lens system further arranged to fulfill the following condition where reference sybol $\beta_4$ represents the magnification of said fourth lens group $1 < \beta_4 < 1.5$.

* * * * *